3,489,834
HOG CHOLERA VACCINE
James A. Baker, Ithaca, N.Y., assignor to Cornell Research Foundation, Inc., Ithaca, N.Y., a corporation of New York
No Drawing. Filed Dec. 1, 1961, Ser. No. 156,487
Int. Cl. C12k 1/06, 5/00, 7/00
U.S. Cl. 424—89                                 4 Claims The present invention relates to the method of producing an attenuated, non-virulent strain of hog cholera virus for use in the preparation of an improved hog cholera vaccine. More specifically, the present invention is directed to a practical method for the conversion of a highly virulent, persistent strain of hog cholera virus to an attenuated, non-virulent strain, the use of the attenuated strain in the preparation of a standardized highly potent and safe hog cholera vaccine and the resulting vaccine.

Hog cholera has been recognized as an independent disease for over a half a century. De Schweintz, E. A., and Dorset, M., U.S. BAI Circ. No. 41 (1903). Since this time, and particularly in the last 15–20 years, much work has been done in this field, but the disease is still widespread and causes enormous economic losses. In view of this, coupled with the limitations on available means of preventing hog cholera, the United States Government has recently put into action an all-out program in an attempt to eradicate the disease.

Immunization against hog cholera has for the most part been carried out by inoculation with a combination made up of hyper-immune serum and live virulent virus, maintained by passage in pigs, or by the use of modified or attenuated virus obtained by serial passages of the virus through other animals such as the rabbit. Baker, James A., "Proceedings Book," American Veterinary Medical Association, Eighty-Eighth Annual Meeting, pp. 55–61, August 1951. See also U.S. Patent No. 2,518,978.

These methods of hog cholera vaccination have their limitations and have proven objectionable for various reasons. One of the most serious objections to the use of the hyper-immune serum-virus combination, for example, resides in the fact that the virulent virus used in this immunizing treatment can cause an outbreak of hog cholera in animals exposed to one recently vaccinated. The use of attenuated non-virulent virus should avoid this objection, but the problem has been to find a practical method of attenuating the virus which, on the one hand, can immunize the animal injected and yet, on the other hand, not produce clinical disease or create a new center of infection.

One of the principal, if not the basic, objection to hog cholera vaccines available up to the present time, however, is that the vaccines are not standardized and, as such, their immunizing characteristics as well as their safety have been open to question. Indeed, and aside from ascertaining the concentration of the virus in the vaccine, the only method available up to the time of the present invention to even ascertain whether live virulent or non-virulent virus was present, was by inoculation in pigs, and pig studies are not easily done.

Cultivation in tissue culture of a cytopathogenic strain of hog cholera virus, with observable degeneration of cells, would avoid this fundamental problem and provide ready means for standardizing vaccines. Prior to the discoveries noted below, however, no strain of hog cholera virus cultivated in tissue culture with observable cytopathic effects was known.

The principal object of the present invention is to provide a standardized hog cholera vaccine.

Another object of the present invention is to provide a potent hog cholera vaccine which, on the one hand, will immunize pigs and yet, on the other hand, will be safe to use.

Still another object of the present invention is to provide a practical means for producing a standardized, highly potent and safe hog cholera vaccine.

Other objects will be apparent as the description proceeds.

In investigations in this field searching for a cytopathogenic strain of hog cholera virus, and specifically for a cytopathogenic strain that could be attenuated and converted into a stable, non-virulent strain suitable for use in a hog cholera vaccine, many experiments, tests, etc. and modifications thereof were tried. During these investigations epidemiological studies on hog cholera led to the discovery of a persistent virus strain. Baker, James A., and Sheffy, Ben E., Proc. Soc. Exp. Biol. and Med., 105, 675–678 (1960). As pointed out by Baker and Sheffy, supra, when 25 non-immune, young pigs, six weeks old, were inoculated with hog cholera virus, virulent strain A modified by rabbit passage, Baker, James A., Proc. Soc. Exp. Biol. and Med., 63, 183 (1946), clearance of the virus from the blood of most of the young pigs did not take place as expected. Instead, tremendous quantities of persistent virulent virus remained in the blood until death, which occurred at various intervals from 6–17 weeks after inoculation. Also, these young pigs, unlike the immune pigs and 3-month old pigs, also used in this study, remained stunted although they continued to eat and show normal activity until a few days before death.

This persistent virus strain proved to be unique. Pigs, for example, inoculated with the persistent virus, recovered from the spleen of the stunted pigs, showed a shorter incubation period and died in less time than pigs inoculated with virulent strain A virus maintained by serial passage in pigs. Also, suspensions of spleen from 10 stunted pigs, infected susceptible pigs at dilutions of $10^{-7}$, $10^{-8}$ and $10^{-9}$, while spleen suspensions from 5 moribund pigs that had been inoculated with virulent strain A virus, infected susceptible pigs at dilutions of $10^{-4}$ and $10^{-5}$ but did not infect susceptible pigs at dilutions of $10^{-6}$. These data show that the original modified strain A virus had changed its character in the young stunted pigs, from modified to virulent, and that the changed virus, apparently a mutant, had greater virulence than that possessed by its ancestral strain A.

The persistent virus strain described above has been designated PAV–1. It is on deposit at and can be obtained from the New York State, Veterinary Virus Research Institute, Cornell University, Ithaca, N.Y.

In continued investigations, searching for a cytopathogenic strain of hog cholera virus, the persistent strain, PAV–1, described above, together with virulent strain A, maintained as fully virulent virus by transfer in pigs, and modified strain A, modified in virulence by 17 serial transfers in rabbits, along with other virulent strains of hog cholera virus obtained from Purdue University and Pennsylvania State University, were propagated in tissue culture. Of this group of hog cholera virus, using cells of pig kidneys, obtained from pigs either prior to or after birth, and standard virus culture media, e.g., the Karzon medium, Science, 130, 1078 (1959), or the commercially available Parker 199 medium or the like, in combination with lamb serum or the equivalent, the only strain that proved to be cytopathogenic was PAV–1, the persistent strain described above. This discovery or "break-through," i.e., the finding of the first cytopathogenic strain of hog cholera virus, is reported by Gillespie, James H., Sheffy, Ben E. and Baker, James A., Proc. Soc. Exp. Biol. and Med., 105, 679–681 (1960). However, the practical importance of this "break-through" remained undetermined and, indeed, questionable, at this time, for, as reported by Gillespie, Sheffy and Baker, supra, tissue-cultured PAV-1 virus from 8 and 16 and even 32 serial transfers, when inoculated in pigs, produced signs of illness and lesions typical of hog cholera, including elevated temperatures followed by death.

Investigations, however, were continued by serial passage of PAV-1 through additional tissue cultures of the type disclosed by Gillespie, Sheffy and Baker, supra. For tests, susceptible pigs approximately 6 weeks of age, were given 1 ml. of undiluted tissue culture fluid intramuscularly. Tests with PAV-1, after 40 serial passages in tissue culture, although accompanied by some temperature rise for a few days, showed that the virus had been modified sufficiently so that it did not kill. Continued serial passages through tissue culture showed PAV-1, after 52 passages, to still cause some temperature rise, with transmission of the virus from the inoculated pigs to susceptible or non-immune control pigs. With continued serial passages through the tissue culture, it was then discovered, after 72 passages, that inoculations of susceptible pigs with PAV-1 resulted in a temperature rise of only about 1° F. and for one day only with no signs of illness. It was also discovered, after 72 passages, that the virus from inoculated pigs was not passed or transmitted to other pigs. Of utmost importance, investigations further showed, after 72 passages through tissue culture, that inoculations with the formerly highly virulent persistent hog cholera virus PAV-1, resulted in the production of a high concentration of protective antibodies, i.e., pig immunization of the type desired.

Investigations have shown that the PAV-1 virus of the present invention can be cultured in conventional virus tissue culture and that the virus is sufficiently attenuated when inoculations of 1 ml. of tissue culture fluid in non-immune pigs results in a temperature elevation of about 1° F. for only one day. In general, for ready control, it is preferred to attenuate the virus in cell cultures showing cytopathic effects. However, and regardless of the cell cultures used for attenuation, for standardization, the final cultures of the attenuated virus from which the vaccine is prepared by conventional procedures, must be cell cultures showing cytopathic effects. The observable cell degeneration in such cultures not only shows the presence of live virus, but also the relative amounts of degeneration serve to show the relative amounts of virus present in the culture fluid. This latter feature using standard or conventional virus titrations, provide the means for standardizing the vaccine. As noted above, standardization is essential to control the efficacy, the immunizing potency and the safety of the vaccine.

The advantages of the present invention which provides for the standardization of the vaccine without tests in pigs after attenuation of the virus, will be readily apparent to those skilled in the art. Also, as tests in pigs only indicate that the vaccine is or is not effective, and, as such, do not provide for the standardization of the vaccine, the inherent advantages of the standardized vaccine of the present invention will be obvious to those engaged in the eradication of hog cholera.

It is claimed:

1. The method of producing a standardized hog cholera vaccine which comprises serially passing persistent strain hog cholera virus PAV-1 through cell cultures until inoculations of 1 ml. of the culture fluid in non-immune pigs results in a temperature elevation of about 1° F. for only one day, culturing the resulting attenuated virus in cell cultures showing observable cytopathic effects and then preparing the vaccine from the resulting cultures.

2. Hog cholera vaccine prepared by the process of claim 1.

3. The method of claim 1 where persistent strain hog cholera virus PAV-1 is attenuated in cell cultures showing observable cytopathic effects.

4. The process of producing an attenuated vaccine for immunizing hogs against hog cholera which comprises introducing an inoculum of PAV-1, a persistent virus strain of hog cholera virus capable of producing a cytopathogenic effect in its original passage into a nontoxic fluid tissue culture medium containing viable cells of porcine kidney tissue, incubating said tissue culture medium until a cytopathogenic effect is produced on said tissue, and thereafter serially passing the virus through other cultures of porcine kidney tissue, for at least about 40 passages.

References Cited

P.S.E.B.M. 105, pp. 675–681 (1960).

S. K. ROSE, Primary Examiner

U.S. Cl. X.R.

195—1.1, 1.3, 1.8